United States Patent
Okamoto (10) Patent No.: US 9,522,672 B2
(45) Date of Patent: Dec. 20, 2016

(54) VEHICLE CONTROL SYSTEM

(71) Applicant: DENSO CORPORATION, Kariya, Aichi-pref. (JP)

(72) Inventor: Tsuyoshi Okamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/614,954

(22) Filed: Feb. 5, 2015

(65) Prior Publication Data

US 2015/0217757 A1 Aug. 6, 2015

(30) Foreign Application Priority Data

Feb. 6, 2014 (JP) ................. 2014-021251

(51) Int. Cl.

| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2016.01) |
| *B60W 10/06* | (2006.01) |

(Continued)

(52) U.S. Cl.
CPC ............ *B60W 20/106* (2013.01); *B60W 10/06* (2013.01); *B60W 10/08* (2013.01); *B60W 10/26* (2013.01); *B60W 20/13* (2016.01); *B60W 20/15* (2016.01); *B60W 2510/0676* (2013.01); *F02D 2200/021* (2013.01); *F02D 2250/24* (2013.01); *Y02T 10/6286* (2013.01); *Y10S 903/93* (2013.01)

(58) Field of Classification Search
CPC .. B60W 20/106; B60W 20/108; B60W 10/06; B60W 10/08; B60W 10/26; B60W 20/13; B60W 20/15; B60W 2510/0676; F02D 29/06; F02D 35/00; F02D 2200/021; F02D 2250/24; Y10S 903/93; Y02T 10/6268
USPC ........................................................ 701/22
See application file for complete search history.

(56) References Cited

U.S. PATENT DOCUMENTS

2007/0246554 A1\* 10/2007 Watanabe .............. B60H 1/004
237/2 A
2009/0326749 A1\* 12/2009 Uchida .............. G01R 31/3679
701/22

(Continued)

FOREIGN PATENT DOCUMENTS

| JP | 2009-160978 | \* | 7/2007 |
|---|---|---|---|
| JP | 5042816 | | 7/2012 |

*Primary Examiner* — Calvin Cheung
*Assistant Examiner* — Paula L Schneider
(74) *Attorney, Agent, or Firm* — Nixon & Vanderhye P.C.

(57) ABSTRACT

A hybrid control device calculates engine rotational speed and engine torque based on cooling water temperature for an engine and a charging state of a main battery. The hybrid control device operates the engine in a maximum charging efficiency mode, when the cooling water temperature is lower than a target temperature value and the main battery has a remaining charging capacity. In the maximum charging efficiency mode, the hybrid control device calculates such engine rotational speed and engine torque, which realize engine operation according to which a fuel consumption amount for a unit amount of charging electric power is minimized. As a result, efficiency of a vehicle control system is improved as a whole, to thereby improve fuel consumption ratio.

4 Claims, 7 Drawing Sheets

(51) Int. Cl.
*B60W 10/08* (2006.01)
*B60W 10/26* (2006.01)

(56) References Cited

U.S. PATENT DOCUMENTS

2013/0076366 A1* 3/2013 Arizono ............. G01R 31/3689
324/435
2013/0311119 A1* 11/2013 Tamezane ............. H01M 10/44
702/63

* cited by examiner

VEHICLE CONTROL SYSTEM

CROSS REFERENCE TO RELATED APPLICATION

This application is based on Japanese Patent Application No. 2014-021251 filed on Feb. 6, 2014, the disclosure of which is incorporated herein by reference.

FIELD OF TECHNOLOGY

The present disclosure relates to a vehicle control system.

BACKGROUND

A heating system by use of a heater core for a vehicle is known in the art, according to which waste heat of an internal combustion engine is utilized. For example, as disclosed in Japanese Patent No. 5,042,816, in a hybrid vehicle having the heating system by use of the heater core, an internal combustion engine is operated in a first operating mode or in a second operating mode. In the first operating mode, the engine is operated at a constant engine rotational speed at which a value for BSFC (Brake Specific Fuel Consumption) is minimized when temperature of engine cooling water is lower than a predetermined value. In the second operating mode, the engine is operated to generate electric power, which satisfies only electric power to be consumed by accessory devices of the vehicle.

In the first operating mode of the vehicle control system of the above prior art, the engine operation is controlled in such a way that the value of the BSFC is minimized. Energy efficiency of the engine itself can be maximized when the engine is operated in the engine operating mode for minimizing the BSFC. However, it is not always true that the energy efficiency can be also maximized, when the energy efficiency is evaluated as a whole system, because there exist some energy losses in the whole system of a vehicle control, such as, a motor-generator loss, a battery loss and so on.

SUMMARY OF THE DISCLOSURE

The present disclosure is made in view of the above problem. It is an object of the present disclosure to provide a vehicle control system, according to which energy efficiency of a vehicle control system is increased as a whole and thereby a fuel consumption ratio can be improved.

According to a feature of the present disclosure, a vehicle control system controls a hybrid vehicle which has;

an engine for producing a driving force for the hybrid vehicle;

a motor-generator for generating electric power when the motor-generator is driven to rotate by the engine;

an electric-power charging device connected to the motor-generator for charging the electric power generated at the motor-generator and for supplying the electric power to an electric load of an accessory device mounted to the hybrid vehicle; and a control device for controlling an operation of the engine.

The control device of the vehicle control system comprises;

a first portion for obtaining information of cooling water temperature, which is temperature of cooling water for the engine;

a second portion for obtaining information of a charging state of the electric-power charging device; and a third portion for calculating an engine operating point including engine rotational speed and engine torque.

The third portion operates the engine in a first operating mode when the cooling water temperature is lower than a predetermined temperature and the charging state of the electric-power charging device has a remaining charging capacity. In the first operating mode, the third portion calculates such engine rotational speed and engine torque based on the charging state of the electric-power charging device, which realize such engine operation according to which a fuel consumption amount for a unit amount of electric power to be charged into the electric-power charging device is minimized.

In addition, the third portion operates the engine in a second operating mode when the cooling water temperature is lower than the predetermined temperature and the charging state of the electric-power charging device has no remaining charging capacity. In the second operating mode, the third portion calculates such engine rotational speed and engine torque, which realize such engine operation according to which minimum electric power is generated by the motor-generator, wherein the minimum electric power satisfies at least electric power to be consumed by the electric load of the accessory device.

According to the present disclosure, the engine is operated based on the charging state of the electric-power charging device (a battery) in such a way that a charging efficiency (which corresponds to an energy efficiency of the whole system) is maximized. For example, when compared with a case in which the engine is operated at an engine operating point enabling that the BSFC is minimized so as to maximize the efficiency of the engine itself, the energy efficiency of the whole system becomes higher in the present disclosure. In addition, since the electric power, which is charged into the battery when the charging efficiency is high, is used for running the vehicle in an EV running mode, a fuel consumption ratio can be improved.

The third portion of the control device of the vehicle control system calculates the engine rotational speed and the engine torque based on a current cooling water temperature, a target temperature value for the cooling water temperature, a current-charging state value of the electric-power charging device and a target charging-state value for the charging state of the electric-power charging device.

Since the engine rotational speed and the engine torque are calculated by taking into consideration the above parameters (the current cooling water temperature, the target temperature value, the current charging-state value and the target charging-state value) and engine output is thereby continuously changed, it becomes possible to operate the engine in an engine operating mode of a relatively high efficiency during a period until the cooling water temperature reaches the target temperature value. As a result, it is possible to improve the energy efficiency of the system as a whole. In particular, it is possible to improve fuel consumption ratio during an engine warm-up operation.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained hereinafter by way of multiple embodiments with reference to the drawings. The same reference numerals are given to the same or similar structure and/or portion in order to avoid repeated explanation.

First Embodiment

Figure 1:
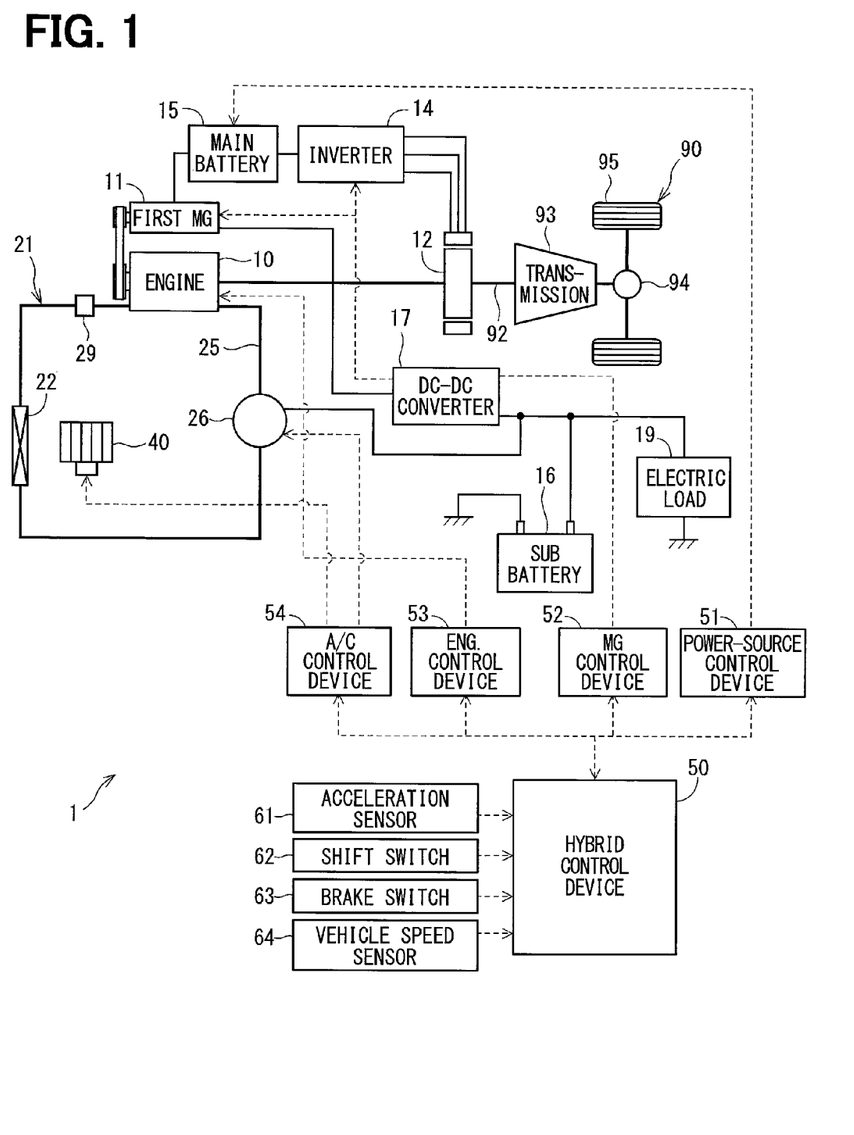
FIG. 1 is a diagram showing an outline of a structure of a vehicle control system according to a first embodiment of the present disclosure.

A vehicle control system 1 is shown in FIG. 1, to which a vehicle control apparatus according to a first embodiment of the present disclosure is applied. The vehicle control system 1 is composed of an internal combustion engine 10 (hereinafter, the engine 10), a first motor-generator 11, a second motor-generator 12, a main battery 15 as an electric-power charging device, a heating system 21 utilizing waste-heat of the engine 10, a hybrid control device 50 and so on. Hereinafter, the motor-generator is also referred to as the MG.

The engine 10 having multiple cylinders forms a power driving source for a vehicle 90 together with the first MG 11 and the second MG 12. In the present embodiment, the vehicle 90 is a hybrid vehicle, which runs by driving force produced at the engine 10 as well as driving force generated at the first and the second MGs 11 and 12.

Each of the first MG 11 and the second MG 12 has a first function as an electric motor for generating rotational torque when the electric power is supplied thereto from the main battery 15 and a second function as an electric power generating device for generating electric power when it is driven to rotate by the engine 10 or when it is driven to rotate during a vehicle braking operation of the vehicle 90. Each of the first and the second MGs 11 and 12 is a three-phase alternating current electric machine having permanent magnets of a synchronous type.

The first MG 11 is driven to rotate by the engine 10 and mainly used as the electric power generating device. The electric power generated by the first MG 11 is charged into the main battery 15 via an inverter device (not shown) and so on.

The second MG 12 is mainly used as the electric motor for generating the driving force. The electric power is supplied from the main battery 15 to the second MG 12 via an inverter device 14 during a vehicle running operation. The second MG 12 also works as the electric power generating device during a regenerative control. The electric power generated by the regenerative control is supplied to the main battery 15 via the inverter device 14.

The driving force of the engine 10 as well as the driving force of the second MG 12 is transmitted to a transmission apparatus 93 via a drive shaft 92. The driving force is further transmitted to driving wheels 95 of the vehicle 90 via a differential gear 94. The transmission apparatus 93 of the present embodiment is, for example, a continuously variable transmission apparatus.

The main battery 15 is composed of, for example, a nickel-hydrogen secondary battery, a lithium-ion secondary battery or the like, which is capable of charging and discharging the electric power. The main battery 15 is so controlled that SOC (State of Charge) is within a predetermined range. In the present embodiment, the SOC corresponds to "charging state of the electric-power charging device".

The electric power is exchanged between the main battery 15 and the first and the second MGs 11 and 12. More exactly, AC power (alternating-current power) generated at the first MG 11 or the second MG 12 is converted into DC power (direct-current power) and such DC power is charged into the main battery 15. On the other hand, the DC power of the main battery 15 is converted into the AC power and mainly supplied to the second MG 12.

A sub-battery 16 is a battery having an output voltage lower than that of the main battery 15. The sub-battery 16 is connected to the main battery 15 via a DC-DC converter 17, so that voltage of the electric power of the main battery 15 is decreased by the DC-DC converter 17 and such electric power of the decreased voltage is charged in the sub-battery 16. An electric connecting line between the sub-battery 16 and the main battery 15 is omitted in FIG. 1 for the purpose of simplification. The electric power of the sub-battery 16 is supplied to various kinds of electric loads 19, an electrically powered pump 26, an electric motor of a blower fan device 40 and so on, which are operated with the electric power of the lower voltage. In the present embodiment, the electric loads 19, the electrically powered pump 26 and the blower fan motor 40 are collectively referred to as an electric load of an accessory device mounted to the vehicle.

The heating system 21 is composed of a heater core 22, a cooling water circulation path 25 and the electrically powered pump 26. The heater core 22 takes out heat from engine cooling water for the engine 10 and supplies the heat into a passenger compartment of the vehicle 90 so as to carry out heating operation. The blower fan device 40 supplies air into the passenger compartment of the vehicle 90.

A water jacket is formed in a cylinder block and a cylinder head of the engine 10 so that the engine cooling water passes through the water jacket in order to cool down the engine 10. The cooling water circulation path 25 is connected to the water jacket. The electrically powered pump 26 is provided in the cooling water circulation path 25 so that the engine cooling water is circulated when the electric power is supplied from the sub-battery 16 to the electrically powered pump 26. A flow rate of the engine cooling water to be circulated in the cooling water circulation path 25 is controlled by changing a discharge amount of the electrically powered pump 26.

The cooling water circulation path 25 extends from a water outlet port of the engine 10 to the heater core 22 and returns to the engine 10 via the heater core 22. The air supplied from the blower fan device 40 passes through the heater core 22, so that heat exchange is carried out between the air and the engine cooling water. The air is heated up and such hot air is supplied into the passenger compartment through air ducts of the vehicle 90.

In the above structure of the heating system 21, the discharge amount of the electrically powered pump 26 and an operational condition of the blower fan device 40 are controlled in order to control heat quantity to be supplied from the engine cooling water into the passenger compartment via the heater core 22.

A water temperature sensor 29 is provided in the cooling water circulation path 25 at a position close to the water outlet port of the engine 10. The water temperature sensor 29 detects temperature of the engine cooling water (hereinafter, cooling water temperature "W"), which passes through the cooling water circulation path 25 from the water outlet port of the engine 10 to the heater core 22.

The vehicle control system 1 is composed of the hybrid control device 50, a power-source control device 51, an MG control device 52, an engine control device 53, an A/C (air-conditioner) control device 54 and so on. Each of the control devices 51 to 54 is composed of a micro-computer including a CPU, a ROM, a RAM and so on. Each control device carries out its control by executing various kinds of control programs memorized in the ROM.

Various kinds of signals are inputted to the hybrid control device 50 from an acceleration sensor 61, a shift switch 62, a brake switch 63, a vehicle speed sensor 64, the water temperature sensor 29 and so on. The hybrid control device 50 controls the vehicle 90 as a whole based on the above inputted information. In FIG. 1, an electrical connection line related to the water temperature sensor 29 is omitted for the sake of simplification.

The power-source control device 51 receives information for the SOC (State Of Charge) from the main battery 15 and monitors so as to control that the SOC falls within a predetermined range.

The MG control device 52 controls operations of the first MG 11 and the second MG 12 based on command signals from the hybrid control device 50.

The engine control device 53 controls an operation of the engine 10 based on the command signals from the hybrid control device 50. More exactly, the engine control device 53 carries out the following controls, which include a control of fuel injection by fuel injection devices, a control of ignition timing by an ignition device, a control of valve timing for intake and exhaust valves by a valve timing control device, a control of intake-air amount by a throttle valve device, and so on. Accordingly, the operation of the engine 10 is controlled.

The A/C control device 54 controls operations of the blower fan device 40, the electrically powered pump 26 and so on based on the command signals from the hybrid control device 50.

In the present embodiment, operating modes of the engine 10 are decided, in view of energy efficiency of the entire system, in order to effectively complete an engine warm-up operation and to increase the SOC of the main battery 15.

An engine control process of the present embodiment will be explained with reference to a flow-chart shown in FIG. 2. The engine control process is repeatedly carried out by the hybrid control device 50 when an ignition switch (not shown) is turned on.

At a step S101, the hybrid control device 50 (hereinafter, also referred to as the computer 50) obtains information relating to a running speed of the vehicle 90 (hereinafter, the vehicle speed "V") from the vehicle speed sensor 64. In addition, the computer 50 obtains information relating to the cooling water temperature "W" from the water temperature sensor 29 and information relating to acceleration opening degree from the acceleration sensor 61. The computer 50 calculates a vehicle running load "D" based on a map for the acceleration opening degree and the vehicle speed "V". The computer 50 further obtains the information for the SOC of the main battery 15 from the power-source control device 51.

At a step S102, the computer 50 determines whether the vehicle is in a condition being capable of running in an EV running mode. In the present embodiment, the computer 50 determines that the vehicle is in the condition being capable of running in the EV running mode, when the vehicle speed "V" is lower than a vehicle-speed threshold value "Vth" and when the vehicle running load "D" is smaller than a vehicle-load threshold value "Dth". When the computer 50 determines that the vehicle is not in the condition being capable of running in the EV running mode, that is, when NO at the step S102 (when the vehicle speed "V" is equal to or higher than the vehicle-speed threshold value "Vth" or the vehicle running load "D" is equal to or larger than the vehicle-load threshold value "Dth"), the process goes to a step S106. When the computer 50 determines that the vehicle is in the condition being capable of running in the EV running mode, that is, when YES at the step S102 (when the vehicle speed "V" is lower than the vehicle-speed threshold value "Vth" and the vehicle running load "D" is smaller than the vehicle-load threshold value "Dth"), the process goes to a step S103.

At the step S103, the computer 50 determines whether an engine warm-up operation is completed or not. In the present embodiment, the computer 50 determines that the engine warm-up operation is completed when the cooling water temperature "W" reaches a target temperature value "Wg". When the computer 50 determines that the engine warm-up operation is not yet completed, that is, when NO at the step S103 (when the cooling water temperature "W" is lower than the target temperature value "Wg"), the process goes to the step S106. When the computer 50 determines that the engine warm-up operation is completed, that is, when YES at the step S103 (when the cooling water temperature "W" is equal to or higher than the target temperature value "Wg"), the process goes to a step S104.

At the step S104, the computer 50 determines whether there is a demand for charging the electric power to the main battery 15 (hereinafter, the electric-power charging demand). In the present embodiment, the computer 50 determines that there is the electric-power charging demand, when the SOC is lower than a power-charge demand value "C1". When the computer 50 determines that there is the electric-power charging demand, that is, when YES at the step S104 (when the SOC is lower than the power-charge demand value "C1"), the process goes to a step S107. On the other hand, when there is no demand for charging the electric power, that is, when NO at the step S104 (when the SOC is higher than the power-charge demand value "C1"), the process goes to a step S105.

At the step S105, the computer 50 stops the operation of the engine 10 and changes the vehicle operation to the EV running mode, because each of the vehicle running condition, the cooling water temperature "W" and the SOC of the main battery 15 satisfies a prerequisite condition for allowing the vehicle operation in the EV running mode.

When the computer 50 determines that the vehicle is not in the condition being capable of running in the EV running mode (that is, NO at the step S102), or when the computer 50 determines that the engine warm-up operation is not yet completed (that is, NO at the step S103), the process goes to the step S106 at which the computer 50 determines whether there is a remaining capacity for charging the electric power in the main battery 15 (hereinafter, the remaining charging capacity). In the present embodiment, the computer 50 determines that there is no remaining charging capacity, when the SOC is larger than a power-charge switching value "C2". The power-charge switching value "C2" is set at such a value, which is larger than the power-charge demand value "C1" but smaller than an upper limit value of the SOC (hereinafter, the SOC upper limit). When the computer 50 determines that there is no remaining charging capacity, that is, NO at the step S106 (when the SOC is larger than the power-charge switching value "C2"), the process goes to a step S108. When the computer 50 determines that there is the remaining charging capacity, that is, when YES at the step S106 (when the SOC is equal to or smaller than the power-charge switching value "C2"), the process goes to the step S107.

When the computer 50 determines that there is the electric-power charging demand (YES at the step S104) or when the computer 50 determines that there is the remaining charging capacity (YES at the step S106), the process goes to the step S107 at which the computer 50 changes the vehicle operation (more exactly, the operating mode of the engine 10) to a maximum charging efficiency mode. More exactly, in the maximum charging efficiency mode, the computer 50 calculates such engine rotational speed "Ne" and engine torque "Te", which realize such engine operation according to which electric-power charging efficiency "E" is maximized. A method for calculating the engine rotational speed "Ne" and the engine torque "Te" for the maximum charging efficiency mode will be explained below.

When the computer 50 determines that there is no remaining charging capacity (NO at the step S106), the process goes to the step S108, at which the computer 50 changes the operating mode of the engine 10 to a load-corresponding power-generation mode. More exactly, in the load-corresponding power-generation mode, the computer 50 calculates such engine rotational speed "Ne" and engine torque "Te", which realize such engine operation according to which at least minimum electric power is generated in order to only satisfy electric-power consumption "Pele" necessary for operating the heating system 21 (more exactly, the electrically powered pump 26) and the electric loads 19. In the present embodiment, the engine rotational speed "Ne" and the engine torque "Te" are calculated, so that the engine 10 outputs such a power which is necessary for not only generating the electric power covering the electric-power consumption "Pele" but also generating the vehicle driving force depending on the vehicle running load "D".

In the load-corresponding power-generation mode, the electric power is not actively charged into the main battery 15, except for surplus electric power, regenerated electric power or the like. Therefore, the output power of the engine 10 is small and the electric-power charging efficiency "E" (hereinafter, the charging efficiency) in the load-corresponding power-generation mode is lower than that of the maximum charging efficiency mode.

The maximum charging efficiency mode will be explained. The charging efficiency "E" is expressed by the following formula (1):

$$E=(Peng-Deng-Pele-Lmg-Lbatt)/FC \quad (1)$$

In the above formula (1), "Peng" is an engine output of the engine 10, "Deng" is an engine load which corresponds to an output of the engine 10 to be directly transmitted to the transmission apparatus 93, "Pele" is the electric-power consumption, "Lmg" is a magneto-generator loss at the first MG 11, "Lbatt" is a battery loss corresponding to a loss for charging the electric power to the main battery 15, and "FC" is a fuel consumption amount.

Calculating methods for the respective values of the right-hand side of the above formula (1) will be explained.

The fuel consumption amount "FC" is calculated by a function (the following formula (2)) having the engine output "Peng" as a variable:

$$FC=f1(Peng) \quad (2)$$

In the above formula (2), fn(x) is a function having "x" as a variable. When a value of "n" for "fn(x)" is different, it is a different function.

The magneto-generator loss "Lmg" is calculated by a function (the following formula (3)) having generated electric power "Pmg" as a variable:

$$Lmg=f2(Pmg) \quad (3)$$

The battery loss "Lbatt" is calculated by a function (the following formula (4)) having an inputted electric power "Pin" to the battery, the SOC and a battery temperature "B" of the main battery 15 as variables:

$$Lbatt=f3(Pin,SOC,B) \quad (4)$$

The inputted electric power "Pin" is calculated by the following formula (5):

$$Pin=Pmg-Pele-Lmg \quad (5)$$

The engine load "Deng" to be directly applied from the transmission apparatus 93 to the engine 10 is calculated by a map based on the vehicle running load "D" and the vehicle speed "V". The vehicle running load "D" is calculated by the map based on the acceleration opening degree and the vehicle speed "V".

Figure 3:
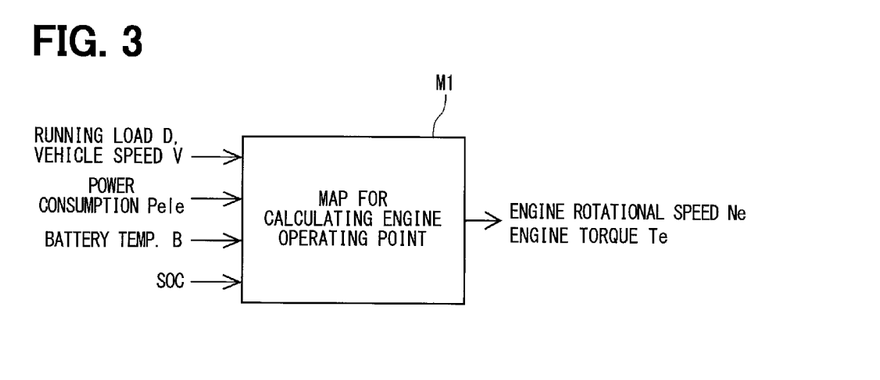
FIG. 3 is a diagram showing a map calculation in a first operating mode of the vehicle control system.

In the present embodiment, an operating point calculating map M1 shown in FIG. 3 (hereinafter, the map M1) is prepared in advance. For the purpose of preparing the map M1, respective values for the vehicle running load "D", the vehicle speed "V", the electric-power consumption "Pele", the battery temperature "B" and the SOC are changed so as to find out the most appropriate engine rotational speed "Ne" and the most appropriate engine torque "Te" with which the charging efficiency "E" is maximized. The map M1 is mounted to the hybrid control device 50. The map M1 may be composed of an n-dimensional map corresponding to a number of the variables or multiple 2-dimensional maps.

Figure 4A:
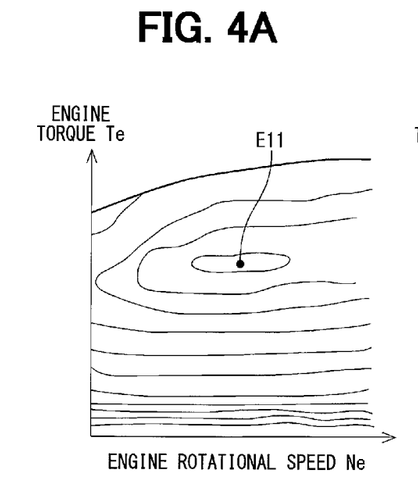
FIGS. 4A and 4B are graphs showing engine torque and engine rotational speed in which electric-power charging efficiency is maximized in the first embodiment.
Figure 4B:
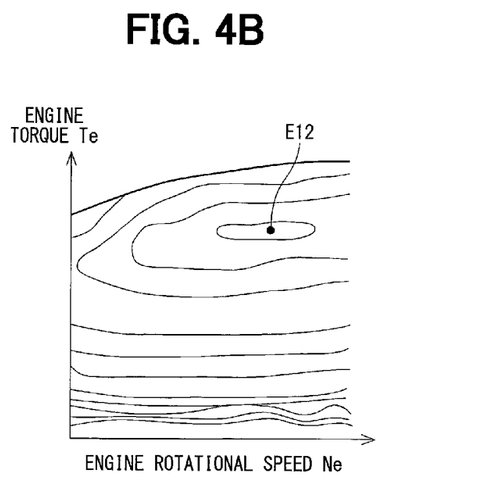

FIGS. 4A and 4B show contour maps for the engine rotational speed "Ne" and the engine torque "Te" in a certain condition of the vehicle running load "D" and the electric-power consumption "Pele".

In FIG. 4A showing contour lines, respective points for the engine rotational speed "Ne" and the engine torque "Te", with which the charging efficiencies "E" equal to each other can be obtained, are connected. As shown in FIG. 4A, in the present embodiment, the engine 10 is operated with such engine rotational speed "Ne" and engine torque "Te" corresponding to a maximum point "E11" for the charging efficiency "E", in view of characteristics of the engine 10, the first MG 11 and the main battery 15. "To control the engine operation in order that the charging efficiency "E" is maximized" can be reworded as "to control the engine operation in order that the fuel consumption amount "FC" for a unit amount of charging the electric power is minimized".

A different map corresponding to FIG. 4A is prepared and used depending on the respective vehicle running load "D" and the respective electric-power consumption "Pele". Therefore, the maximum point "E11" for the charging efficiency "E" is changed depending on the vehicle running load "D" and the electric-power consumption "Pele". In addition, as explained below, the maximum point "E11" for the charging efficiency "E" is different from a minimum point "E12" for the BSFC (Brake Specific Fuel Consumption).

In FIG. 4B showing contour lines, respective points for the engine rotational speed "Ne" and the engine torque "Te", with which the respective values of the BSFC equal to each other can be obtained, are connected. The minimum point "E12" of the BSFC is decided at one point depending on the engine characteristics. "To control the engine operation in such a way that the BSFC is minimized" can be reworded as "to control the engine operation in such a way that the fuel consumption amount for a unit amount of the electric power to be generated is minimized". The operating mode of the engine, according to which the BSFC is minimized, is referred to as a BSFC minimum mode. The BSFC minimum mode will be explained in the present disclosure as a reference example.

Figure 5:
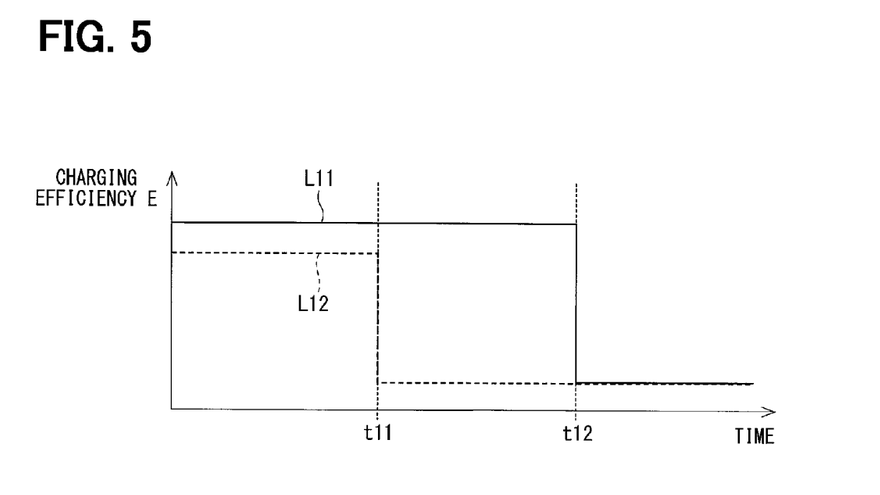
FIG. 5 is a time-chart showing timings, at which engine operation is changed from the first operating mode to a second operating mode.

An operation of switching the engine operation from the maximum charging efficiency mode (S107 in FIG. 2) to the load-corresponding power-generation mode (S108 in FIG. 2) will be explained with reference to FIG. 5. In FIG. 5, a solid line L11 shows the charging efficiency "E" in the case of the maximum charging efficiency mode (carried out at the step S107 of FIG. 2), while a dotted line L12 shows the charging efficiency "E" in the case of the BSFC minimum mode (the reference example).

As indicated by the dotted line L12, the charging efficiency "E" (which can be also regarded as a total efficiency of the vehicle control system) in the case of the engine operation of the BSFC minimum mode is smaller than that in the case of the engine operation of the maximum charging efficiency mode (indicated by the solid line L11).

In the engine operation of the BSFC minimum mode, the SOC is relatively rapidly increased and the SOC reaches the power-charge switching value "C2" at a timing t11. When the SOC reaches the power-charge switching value "C2", the engine operation is switched to the load-corresponding power-generation mode (the charging efficiency "E" of which is lower than that of the BSFC minimum mode), in order that the charging operation to the main battery 15 is suppressed and thereby the SOC will not exceed the upper limit value of the SOC.

On the other hand, as indicated by the solid line L11 in FIG. 5, when the engine 10 is operated in the maximum charging efficiency mode, the charging efficiency "E" is higher than that of the minimum BSFC mode (indicated by the dotted line L12). As explained above, the maximum point "E11" for the charging efficiency "E" is different from the minimum point "E12" for the BSFC. Therefore, an energy efficiency of the engine 10 is not at a maximum value when the engine is operated at the maximum point "E11" for the charging efficiency "E", which is different from the minimum point "E12" of the minimum BSFC mode. The energy efficiency of the engine corresponds to a thermal efficiency of the engine, which means an efficiency of fuel energy to be transformed into mechanical work at an engine output shaft. As a result, an increase of the SOC in the maximum charging efficiency mode is slower than that in the BSFC minimum mode. In other words, the SOC reaches the power-charge switching value "C2" at a timing t12, which is later than the timing t11. Then, at the timing t12, the operating mode of the engine 10 is changed from the maximum charging efficiency mode to the load-corresponding power-generation mode.

According to the present embodiment, when the SOC is lower than the power-charge switching value C2, namely when there is the remaining charging capacity, the operating mode of the engine is switched to the maximum charging efficiency mode. As a result, it is possible not only to increase the energy efficiency of the entire system but also to delay the switching timing of the operating mode of the engine from the maximum charging efficiency mode to the load-corresponding power-generation mode (in which the charging efficiency "E" becomes lower). Accordingly, it is possible to make an operational period of the maximum charging efficiency mode longer, so that the engine 10 can be operated in the operating mode of a relatively high efficiency (the maximum charging efficiency mode) for a longer period. As above, a fuel consumption ratio can be improved.

As explained above, the hybrid control device 50 of the present embodiment controls the vehicle 90. The vehicle 90 has the engine 10 which is the driving power source of the vehicle 90; the first MG 11 and the second MG 12 each of which is driven to rotate by the engine 10 and generates the electric power; and the main battery 15 which is charged by the first MG 11 and the second MG 12 and supplies the electric power to the electric loads.

The hybrid control device 50 carries out the following processes. The hybrid control device 50 obtains the cooling water temperature "W" and the SOC of the main battery 15 (at the step S101 of FIG. 2). Then, the hybrid control device 50 calculates the engine rotational speed "Ne" (the rotational speed of the engine) and the engine torque "Te" (the torque outputted from the engine 10).

More exactly, when the cooling water temperature "W" is lower than the target temperature value "Wg" (NO at the step S103) and the SOC is in the condition that there is the remaining charging capacity (YES at the step S106), the operating mode of the engine 10 is changed to the maximum charging efficiency mode (the step S107). And the hybrid control device 50 calculates the engine rotational speed "Ne" and the engine torque "Te" based on the SOC, which realize the engine operation in such a way that the fuel consumption amount "FC" for the unit amount of charging the electric power to the main battery 15 is minimized.

In addition, when the cooling water temperature "W" is lower than the target temperature value "Wg" (NO at the step S103) and the SOC is in the condition that there is no remaining charging capacity (NO at the step S106), the operating mode of the engine 10 is changed to the load-corresponding power-generation mode (the step S108). And the hybrid control device 50 calculates the engine rotational speed "Ne" and the engine torque "Te", which realize the engine operation in such a way that the minimum electric power is generated in order to satisfy at least the electric-power consumption necessary for operating the electric load of the accessory devices mounted to the vehicle 90.

In the present embodiment, the hybrid control device 50 controls the engine 10 based on the SOC in such a way that the charging efficiencies "E" (which is equal to the efficiency of energy generation as a whole) is maximized. When compared the present embodiment with the case in which the engine 10 is operated at the minimum point "E12" for the BSFC (the engine operation in the minimum BSFC mode) and the efficiency of the engine 10 itself is maximized, the efficiency of the total system of the present embodiment is improved and the fuel consumption ratio for the engine warm-up operation can be improved. It is possible to more properly calculate the engine rotational speed "Ne" and the engine torque "Te", which realize that the charging efficiency "E" is maximized, in particular, when the efficiency of the main battery 15, the efficiency of the first MG 11 and so on are taken into consideration in addition to the SOC.

In addition, the fuel consumption ration can be improved, when the electric power generated and charged during the engine operation of the high charging efficiency "E" is used for the vehicle running of the EV running mode.

In the present embodiment, the hybrid control device 50 works as "a first portion for obtaining information of the cooling water temperature", "a second portion for obtaining information of a charging state (the SOC)" and "a third portion for calculating an engine operating point". The step S101 of FIG. 2 corresponds to a function of "the first portion for obtaining the information of the cooling water temperature" and a function of "the second portion for obtaining the information of the charging state (the SOC)". The step S107 of FIG. 2 corresponds to a function of "the third portion for calculating the engine operating point".

The maximum charging efficiency mode is also referred to as "a first operating mode", while the load-corresponding power-generation mode is also referred to as "a second operating mode". The target temperature value "Wg" of the cooling water temperature corresponds to "a predetermined temperature".

Second Embodiment

A second embodiment of the present disclosure will be explained with reference to FIGS. 6 to 10.

A structure of a vehicle control system of the present embodiment is the same to that of the first embodiment. However, an engine control process of the present embodiment is different from that of the first embodiment.

As already explained above, according to the first embodiment, the engine operating mode is switched over from the maximum charging efficiency mode to the load-corresponding power-generation mode, or vice versa, depending on the SOC, when the cooling water temperature "W" is lower than the target value "Wg".

According to the present embodiment, the engine rotational speed "Ne" and the engine torque "Te" are continuously changed in order that a timing for completing the engine warm-up operation and a timing for the SOC reaching a target SOC value "Cg" coincide with each other as much as possible. According to such an engine operation, the engine output "Peng" is continuously changed.

The engine control process of the present embodiment will be explained with reference to a flow-chart of FIG. 6. The engine control process is repeatedly carried out by the hybrid control device 50 when the ignition switch (an ignition power source: not shown) is turned on.

Figure 2:
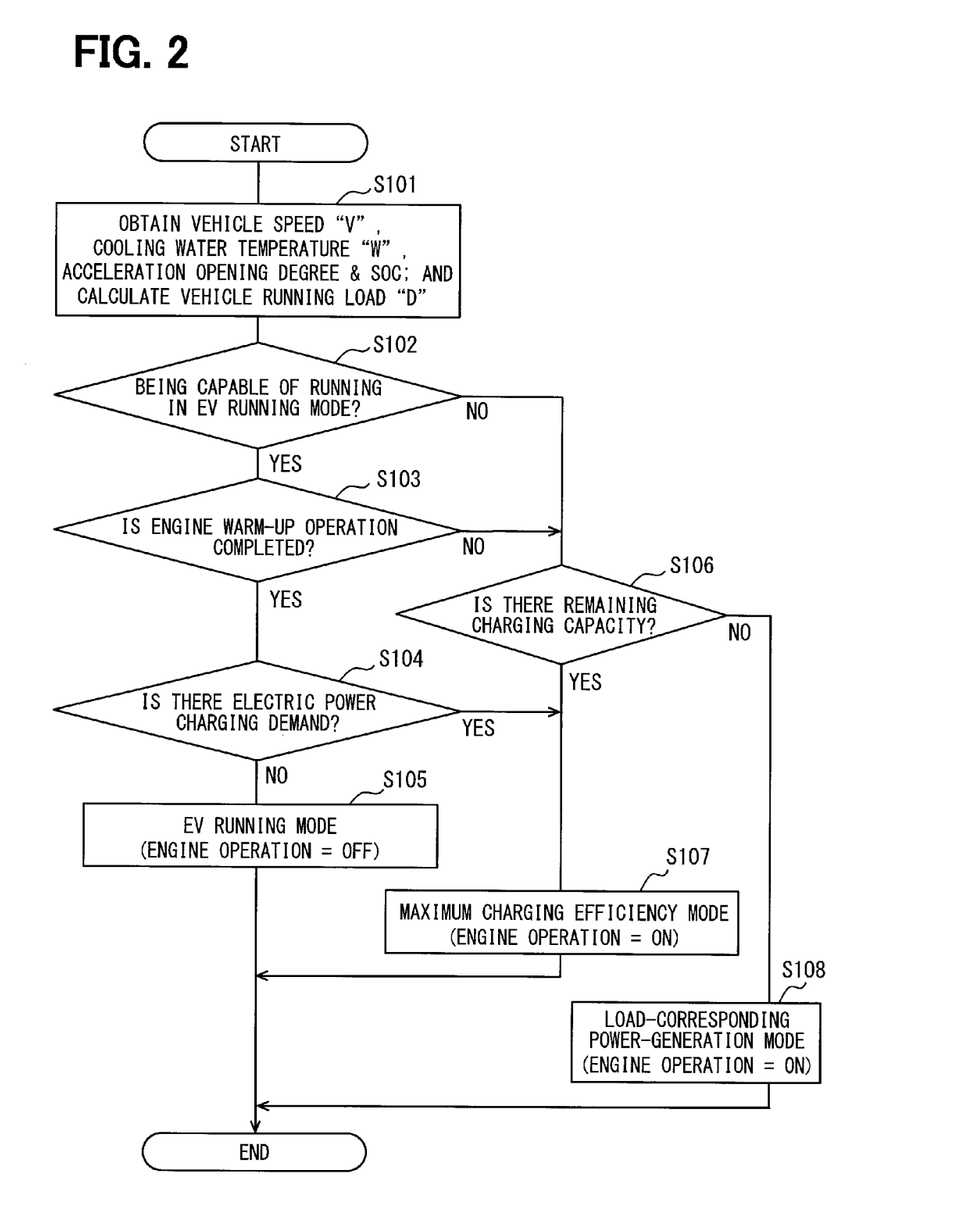
FIG. 2 is a flow-chart showing an engine control process of the vehicle control system according to the first embodiment.
Figure 6:
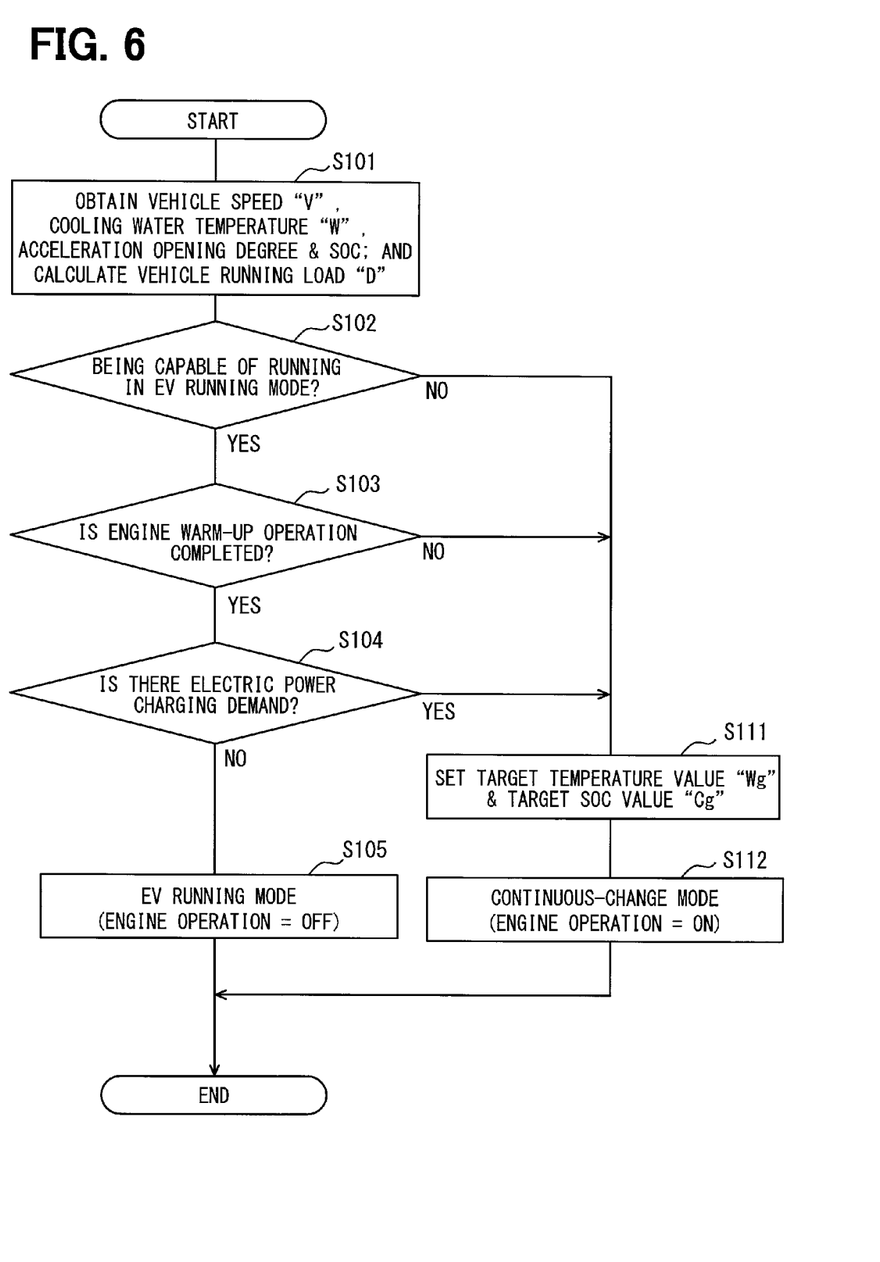
FIG. 6 is a flow-chart showing an engine control process of a vehicle control system according to a second embodiment of the present disclosure.

The steps S101 to S105 of FIG. 6 are substantially equal to those of FIG. 2. When the hybrid control device 50 (also referred to as the computer 50) determines (i) at the step S102 that the vehicle is not in the condition being capable of running in the EV running mode (when NO at the step S102), (ii) at the step S103 that the engine warm-up operation is not yet completed (when NO at the step S103), or (iii) at the step S104 that there is the electric-power charging demand (when YES at the step S104), the process goes to a step S111.

At the step S111, the computer 50 decides the target temperature value "Wg" for the cooling water temperature "W" and the target SOC value "Cg" for the SOC.

At a step S112, the computer 50 changes the engine operating mode to a continuous-change mode. In the continuous-change mode, the computer 50 calculates the engine output "Peng" based on a temperature difference "ΔW" between the current cooling water temperature "W" and the target temperature value "Wg" as well as an SOC difference "ΔC" between the current SOC value and the target SOC value "Cg".

A method for calculating the engine rotational speed "Ne" and the engine torque "Te" will be explained.

At first, a method for deciding the target SOC value "Cg", which is used for calculating the engine rotational speed "Ne" and the engine torque "Te", will be explained.

A default SOC value "Cd" for the target SOC value "Cg" is provisionally set. The computer 50 calculates a predicted SOC value "Cc", which corresponds to an SOC value at a timing when the cooling water temperature "W" reaches the target temperature value "Wg", assuming that the current running condition of the vehicle and the current engine output "Peng" continue without changes.

The vehicle running load "D" and the vehicle speed "V", which are obtained at the step S101, are used as the current running condition of the vehicle, when calculating the future running condition of the vehicle. The engine output "Peng", which is obtained at the step S112 of the previous cycle, is used as the current engine output, when calculating the future engine output.

The vehicle running load "D", the vehicle speed "V" and the engine output "Peng", which are used for calculating the future values (the future running condition of the vehicle and the future engine output), should not be always limited to the current values or the previous values (the values of the previous cycles). A simple mean value or a moving average value for a most recent predetermined period may be used for calculating each of the future values.

The computer 50 compares the predicted SOC value "Cc" with the default SOC value "Cd" for the target SOC value "Cg". When a difference between the predicted SOC value "Cc" and the default SOC value "Cd" is within a predetermined range, the default SOC value "Cd" is decided as the target SOC value "Cg". In a case that the difference between the predicted SOC value "Cc" and the default SOC value "Cd" is larger than the predetermined range, such a value which is obtained by correcting the default SOC value "Cd" to a smaller value is decided as the target SOC value "Cg". On the other hand, in a case that the difference between the predicted SOC value "Cc" and the default SOC value "Cd" is smaller than the predetermined range, such a value which is obtained by correcting the default SOC value "Cd" to a larger value is decided as the target SOC value "Cg".

Figure 7:
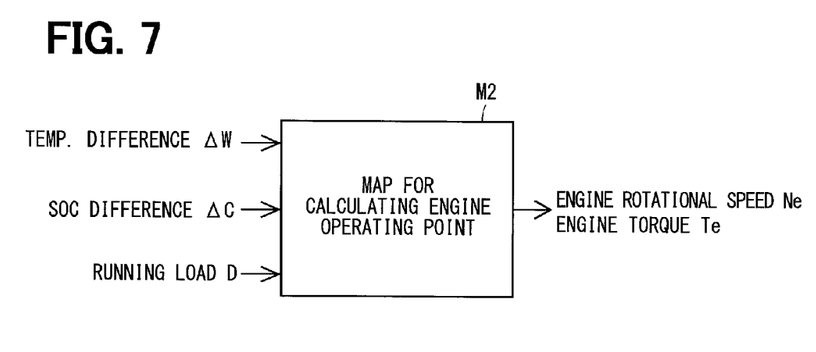
FIG. 7 is a diagram showing a map calculation in the second embodiment.

The computer 50 calculates the engine output "Peng" by use of an operating-point calculating map M2 shown in FIG. 7, based on the temperature difference "ΔW" between the current cooling water temperature "W" and the target temperature value "Wg", the SOC difference "ΔC" between the current SOC value and the above-decided target SOC value "Cg", and so on. Then, the computer 50 calculates the engine rotational speed "Ne" and the engine torque "Te", which realize the above-calculated the engine output "Peng".

In the operating point calculating map M2 shown in FIG. 7, the vehicle running load "D" is used in addition to the temperature difference "ΔW" and the SOC difference "ΔC". The vehicle running load "D", which is used for calculating the predicted SOC value "Cc", is preferably used for the operating point calculating map M2 shown in FIG. 7.

A relationship between the predicted SOC value "Cc" and the engine output "Peng" will be explained.

In the case that the predicted SOC value "Cc" is larger than the default SOC value "Cd", the value of the SOC may become too high at an end of the engine warm-up operation (at the timing when the cooling water temperature "W" reaches the target temperature value "Wg"), if the current running condition of the vehicle and the current engine output "Peng" are continuously maintained. Therefore, when the SOC target value "Cg" is so corrected as to become smaller and thereby the SOC difference "ΔC" is made smaller, the engine output "Peng" calculated by use of the map is made smaller. As above, it is possible to reduce a speed of increase of the SOC. In other words, it is possible to avoid the situation that the value of the SOC may become too high at the end of the engine warm-up operation.

On the other hand, in the case that the predicted SOC value "Cc" is smaller than the default SOC value "Cd", the value of the SOC may become smaller at the end of the engine warm-up operation, if the current running condition of the vehicle and the current engine output "Peng" are continuously maintained. Therefore, when the SOC target value "Cg" is so corrected as to become larger and thereby the SOC difference "ΔC" is made larger, the engine output "Peng" calculated by use of the map is made larger. As a result, it is possible to enhance a speed of increase of the SOC. In other words, it is possible to increase the value of the SOC at the end of the engine warm-up operation.

In the present embodiment, the predicted SOC value "Cc" corresponds to "a predicted charging-state value".

In the present embodiment, the engine rotational speed "Ne" and the engine torque "Te" are continuously changed by repeating the engine control process of FIG. 6, so that the engine output "Peng" is continuously changed so as to gradually make the cooling water temperature "W" and the SOC closer to the respective target values. As already explained, the efficiency of the engine operation (the energy efficiency) is relatively low in the load-corresponding power-generation mode. Therefore, in the present embodiment, it is possible to avoid the engine operation of the low energy efficiency and to continue the engine operation of the relatively high energy efficiency during a period to the end of the engine warm-up operation.

In the present embodiment, the engine warm-up operation is continuously carried out until the cooling water temperature "W" reaches the target temperature value "Wg". However, it is not always necessary to make the SOC to strictly coincide with the target SOC value "Cg". When the SOC is larger within a range not exceeding the upper limit of the SOC, the amount of the electric power which can be used for the vehicle running in the EV mode becomes larger. Therefore, when the SOC is larger, it is more preferable to improve the fuel consumption ratio.

Figure 8:
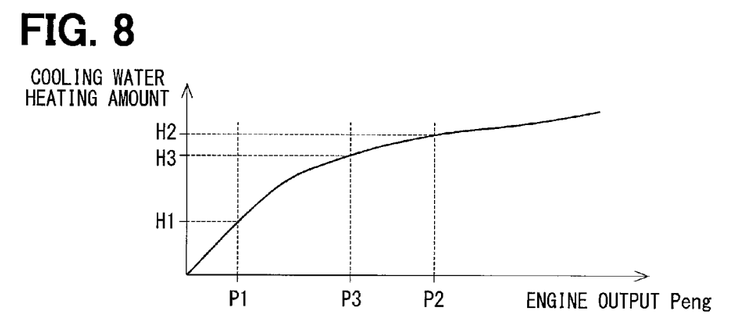
FIG. 8 is a graph showing engine output according to the second embodiment.

The engine output "Peng" obtained by the engine control process of the present embodiment is shown in FIG. 8. The engine output "Peng" in FIG. 8 corresponds to the generated electric power amount.

The engine output "Peng" obtained by the engine operation in continuous-change mode is continuously changed (indicated by "P3") between an engine output "P1" obtained by the engine operation in the load-corresponding power-generation mode and an engine output "P2" obtained by the engine operation in the minimum BSFC mode. A cooling-water heating amount "H3" at the engine output "P3" is a value between a cooling-water heating amount "H1" at the engine output "P1" and a cooling-water heating amount "H2" at the engine output "P2".

Figure 9:
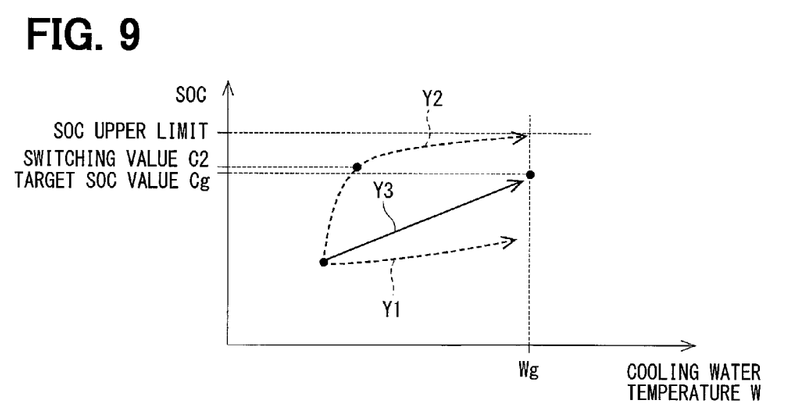
FIG. 9 is a graph showing changes of temperature of engine cooling water and SOC (State of Charge)

As indicated by an arrow "Y1" of a dotted line in FIG. 9, in the engine operation of the load-corresponding power-generation mode, the cooling water temperature "W" and the SOC are not rapidly increased because the engine output "P1" is small. On the other hand, when the engine is operated in the minimum BSFC mode, the engine output "P2" is obtained. Then, as indicated by an arrow "Y2" of a dotted line in FIG. 9, in the engine operation in the minimum BSFC mode, the SOC reaches the power-charge switching value "C2" before the cooling water temperature "W" reaches the target temperature value "Wg". After the SOC reaches the power-charge switching value "C2", it is necessary to change the engine operation to the load-corresponding power-generation mode in order to control the SOC in such a way that the SOC does not exceed the SOC upper limit value.

According to the present embodiment, however, the engine output "Peng" is continuously changed based on the temperature difference "ΔW" and the SOC difference "ΔC" in the engine operation of the continuous-change mode. Therefore, as indicated by an arrow "Y3" of a solid line in FIG. 9, the SOC is controlled at a value within an appropriate range, when the cooling water temperature "W" reaches the target temperature value "Wg". In addition, until the end of the engine warm-up operation, it is possible to operate the engine 10 in the operating mode (the continuous-change mode), the engine output efficiency of which is higher than that of the load-corresponding power-generation mode. In FIG. 9, the target SOC value "Cg" is indicated as a value smaller than the power-charge switching value "C2". However, the target SOC value "Cg" may be larger than, or equal to, the power-charge switching value "C2".

Figure 10A:
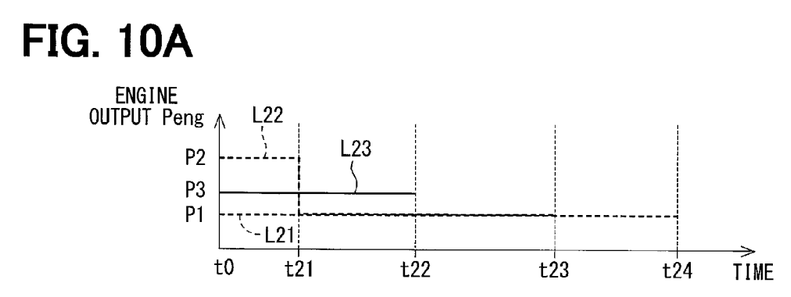
FIGS. 10A, 10B and 10C are graphs showing shifts of engine output, the temperature of the engine cooling water and SOC in the second embodiment.
Figure 10B:
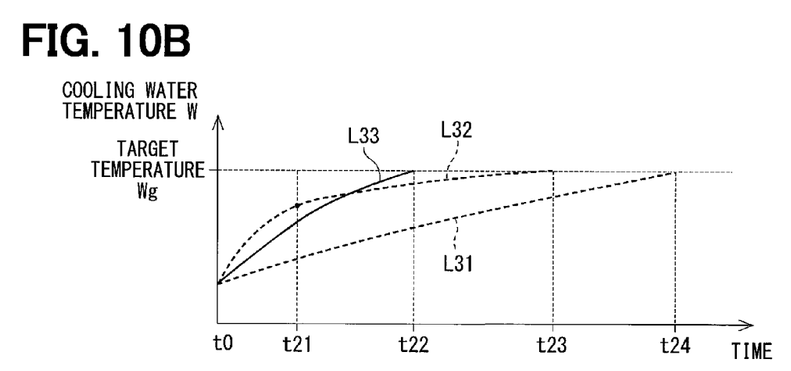
Figure 10C:
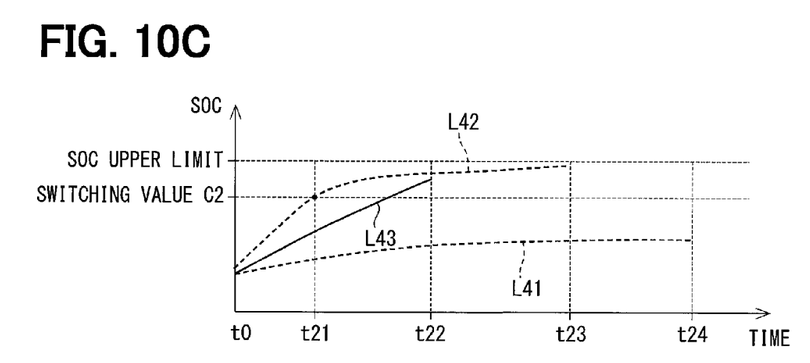

Shifts of the engine output "Peng", the cooling water temperature "W" and the SOC will be explained more in detail with reference to FIGS. 10A to 10C. FIG. 10A shows a shift of the engine output "Peng", FIG. 10B shows a shift of the cooling water temperature "W", and FIG. 10C shows a shift of the SOC. Each of dotted lines L21, L31 and L41 in FIGS. 10A to 10C shows the respective shift, when the engine 10 is operated in the load-corresponding power-generation mode. Each of other dotted lines L22, L32 and L42 shows the respective shift, when the engine 10 is operated in the minimum BSFC mode and the load-corresponding power-generation mode. Each of solid lines L23, L33 and L43 shows the respective shift, when the engine 10 is operated in the continuous-change mode. In the examples shown in FIGS. 10A to 10C, it is presumed that the vehicle running load "D" and the electric load 19 of the accessory devices are constant. Needless to say, when the vehicle running load "D" and/or the electric load 19 of the accessory devices are changed, the engine output "Peng" is correspondingly changed.

When the engine 10 is operated in the load-corresponding power-generation mode, it takes a longer time until the cooling water temperature "W" reaches the target temperature value "Wg", because the engine output "Peng" is small, as indicated by the dotted lines L21 in FIG. 10A and L31 in FIG. 10B.

When the engine 10 is operated in the load-corresponding power-generation mode, the cooling water temperature "W" is gradually increased as indicated by the dotted line "L31" in FIG. 10B, because the engine output "Peng" is small as indicated by the dotted line "L21" in FIG. 10A. As a result, when the engine 10 is operated in the load-corresponding power-generation mode, it takes the longer time until the cooling water temperature "W" reaches the target temperature value "Wg" at a timing "t24". In addition, since the electric power is not actively generated and charged to the main battery 15 in the load-corresponding power-generation mode, the charging amount to the main battery 15 is small and an increasing amount of the SOC is thereby small, as indicated by the dotted line "L41" in FIG. 10C.

When the operating mode of the engine 10 is changed to the minimum BSFC mode, the engine output "Peng" in a first period (t0-t21) is large ("P2") as indicated by the dotted line "L22" in FIG. 10A and the SOC reaches the power-charge switching value "C2" at a timing "t21" as indicated by the dotted line "L42" in FIG. 10C. Therefore, the operating mode of the engine 10 is changed from the minimum BSFC mode to the load-corresponding power-generation mode at the timing "t21". As a result, as indicated by the dotted line "L32" in FIG. 10B, an increasing ratio of the cooling water temperature "W" is large until the timing "t21" but the increasing ratio of the cooling water temperature "W" becomes smaller after the timing "t21". And the cooling water temperature "W" reaches the target temperature value "Wg" at a timing "t23".

As above, in the minimum BSFC mode, a balance between the SOC and the cooling water temperature "W" is lost. More exactly, the SOC may reach a value close to the upper limit value of the SOC, in spite that the cooling water temperature "W" has not yet reached the target temperature value "Wg". This situation is referred to as a condition of "low temperature and high SOC". The cooling water temperature "W" is not rapidly increased, in particular, in a case that there is a demand for the heating operating and thereby the heating system 21 is operated or in a case that the vehicle running load is small. In the condition of "the low temperature and high SOC", it is necessary to operate the engine in the load-corresponding power-generation mode, in which the energy efficiency of the engine operation is low in order to control that the SOC does not exceed the upper limit value of the SOC. In other words, since the engine warm-up operation is carried out in the load-corresponding power-generation mode, a longer time period is necessary until the completion (the end) of the engine warm-up operation.

On the other hand, according to the present embodiment, the engine 10 is operated in the continuous-change mode, in which the engine output "Peng" is calculated based on the temperature difference "ΔW" and the SOC difference "ΔC", as indicated by the solid line "L23" in FIG. 10A. In addition, as indicated by the solid line "L33" in FIG. 10B and the solid line "L43" in FIG. 10C, the cooling water temperature "W" reaches the target temperature value "Wg" at a timing "t22", at which the SOC does not exceed the upper limit value of the SOC. It is, therefore, possible to charge the main battery 15 until the SOC becomes a relatively high value. According to the above operation, it is possible to avoid the condition of "the low temperature and high SOC" and thereby it becomes possible to continue the engine operating mode of the relatively high efficiency until the end of the engine warm-up operation. As a result, the fuel consumption ratio can be improved.

As shown in FIG. 10B, according to the present embodiment, a time period ("t0-t22"), in which the cooling water temperature "W" reaches the target temperature value "Wg" and the engine warm-up operation is completed, becomes shorter than time periods ("t0-t23" or "t0-t24") of the engine operation in the other operating modes. In addition, since the main battery 15 is charged to the condition of the relatively high SOC at the end (the timing "t22") of the engine warm-up operation, it is possible to change the vehicle running condition to the EV running mode shortly after the completion of the engine warm-up operation. Accordingly, the fuel consumption ratio can be further improved.

In the present embodiment, the hybrid control device 50 (the computer 50) carries out the following process.

The computer 50 obtains the cooling water temperature "W" and the value of the SOC for the main battery 15 (at the step S101 in FIG. 6). Then, the computer 50 calculates the engine rotational speed "Ne" and the engine torque "Te" based on the current cooling water temperature "W", the target temperature value "Wg", the current value of the SOC and the target SOC value.

When the engine 10 is operated in the operating mode of the high efficiency for a longer period, the balance between the SOC and the cooling water temperature may be lost and the condition of the vehicle control system is changed to the condition of "the low temperature and high SOC". Then, it becomes necessary by contraries to forcibly operate the engine 10 in the operating mode of the low efficiency, because it is necessary to control the engine operation in such a way that the SOC does not exceed the upper limit value of the SOC. Accordingly, the efficiency of the engine operation may become lower as a whole for the period until the end of the engine warm-up operation.

In view of the above point, according to the present embodiment, the computer 50 calculates the engine rotational speed "Ne" and the engine torque "Te" based on the current cooling water temperature "W", the target temperature value "Wg", the current value of the SOC and the target SOC value "cg", and the engine output "Peng" is continuously changed. As a result, it becomes possible to continuously operate the engine 10 in the operating mode of the relatively high efficiency until the end of the engine warm-up operation. Therefore, it becomes possible to improve the efficiency of the vehicle control system for the period of the engine warm-up operation as a whole. It becomes possible to thereby improve the fuel consumption ratio for the engine warm-up operation.

Furthermore, the hybrid control device 50 (the computer 50) calculates the engine rotational speed "Ne" and the engine torque "Te" based on the temperature difference "ΔW" between the current cooling water temperature "W" and the target temperature value "Wg" as well as the SOC difference "ΔC" between the current SOC value and the target SOC value "Cg". According to the above control, it becomes possible that the timing at which the SOC reaches the target SOC value "Cg" can be made closer to the timing at which the cooling water temperature "W" reaches the target temperature value "Wg". In addition, the main battery 15 is charged with the electric power to the condition close to the target SOC value "Cg" at the end of the engine warm-up operation. Since it becomes possible to run the vehicle in the EV running mode by the electric power, which is charged in the main battery 15 during the engine warm-up operation, the fuel consumption ratio can be improved.

Furthermore, the hybrid control device 50 (the computer 50) predicts the SOC of the timing when the cooling water temperature "W" reaches the target temperature value "Wg". The computer 50 sets the target SOC value "Cg" based on the predicted SOC value "Cc" (which is the prediction result). It is, thereby, possible to calculate more appropriate engine rotational speed "Ne" and the engine torque "Te", which realize that the timing for completing the engine warm-up operation comes closer to the timing at which the SOC reaches the target SOC value "Cg".

In the present embodiment, like the first embodiment, the hybrid control device 50 also works as "the first portion for obtaining the information of the cooling water temperature", "the second portion for obtaining the information of the charging state (the SOC)" and "the third portion for calculating the engine operating point". The step S101 of FIG. 6 corresponds to the function of "the first portion for obtaining the information of the cooling water temperature" and the function of "the second portion for obtaining the information of the charging state (the SOC)". The steps S111 and S112 of FIG. 6 correspond to the function of "the third portion for calculating the engine operating point".

The target SOC value "Cg" corresponds to "a target charging-state value for the charging state" and the SOC difference "ΔC" corresponds to "a charging-state difference".

Further Embodiments and/or Modifications (M1) Modification for SOC

As explained above, it is not always necessary to control the SOC at a specific point but it is sufficient to control the SOC at the value within the predetermined range.

In view of this point, the power-charge demand value "C1" and the power-charge switching value "C2" of the first embodiment may be changed, for example, based on prediction information for the regenerative control.

For example, when it is predicted, based on information regarding a vehicle running course obtained from a navigation apparatus, that there will be a down-grade along the way, there is a high possibility that the main battery will be charged with the electric power generated by the regenerative control. In such a case, the power-charge demand value may be changed to a smaller value so that the range of the SOC is made wider for allowing the vehicle operation in the EV running mode. Alternatively, in the case that there is the high possibility for the main battery being charged with the electric power by the regenerative control, the power-charge switching value and/or the target SOC value may be changed to a smaller value in order to avoid the situation that the SOC exceeds the upper limit value of the SOC.

(M2) Modification for Calculating the Engine Operating Point

Since the SOC is not constantly maintained at the high value when the vehicle running load is high, the condition of "the low temperature and high SOC" is not likely to occur. In the second embodiment, therefore, the map M2 for calculating the engine operating point may be prepared on the assumption that the vehicle running load is low and the vehicle running load may be removed from the parameters for preparing the map.

In the second embodiment, the engine rotational speed and the engine torque are calculated based on the temperature difference "ΔW" and the SOC difference "ΔC". However, the engine rotational speed and the engine torque may be calculated in various manners based on the current cooling water temperature, the target temperature value, the current SOC value and the target SOC value. The predicted SOC value of the timing when the cooling water temperature reaches the target temperature value may be likewise calculated in various manners.

(M3) Modification for the Air Conditioner

The air conditioning apparatus of the above embodiments is composed of the heater core utilizing the waste heat of the engine. The air conditioning apparatus may have not only the heater core of the waste-heat type but also a heat pump system. In such a case, the heat pump system is included in the meaning of the electric load of the accessory devices.

(M4) Modification for the Control Devices

In the above embodiments, the vehicle control system has multiple control devices, such as the hybrid control device, the power-source control device, the MG control device, the engine control device, the A/C control device and so on. However, the above multiple control devices may be formed in a single control unit.

In the above embodiments, "the first portion for obtaining the cooling water temperature", "the second portion for obtaining the charging state (the SOC)" and "the third portion for calculating the engine operating point" are formed in the hybrid control device. However, one or all of the above portions may be formed in the other control device than the hybrid control device. For example, "the third portion for calculating the engine operating point" may be formed in the engine control device.

(M5) Modification for the Vehicle Control System

In the above embodiments, two motor-generators are provided for the hybrid vehicle. The number of the motor-generators is not limited to "two", but any number of the motor-generators may be provided. The hybrid vehicle of the above embodiments has a series-parallel type system. However, any other type (for example, a parallel type, a series type) may be applied to the hybrid vehicle.

The motor-generator of the above embodiments is composed of the three-phase alternating current electric machine having the permanent magnets of the synchronous type. Any kinds of the motor-generator may be used to the vehicle control system of the present disclosure.

Furthermore, the battery of the above embodiments is composed of the secondary battery. However, any other type of the battery, for example, an electric double layer capacitor, may be used for the vehicle control system of the present disclosure, so long as the electric power of the motor generator can be charged into the other type of the battery and the electric power can be discharged therefrom to the electric load.

As above, the present disclosure should not be limited to the above embodiments but can be modified in various manners without departing from a spirit of the present disclosure.

What is claimed is:

1. A vehicle control system for a hybrid vehicle comprising:
an engine configured to produce a driving force for the hybrid vehicle, wherein the hybrid vehicle runs at least with the driving force of the engine in a non-electric-vehicle running mode;
a motor-generator configured to generate electric power when the motor-generator is driven to rotate by the engine, wherein the hybrid vehicle runs only with the electric power of the motor-generator in an electric-vehicle running mode;
an electric-power charging device connected to the motor-generator configured to charged the electric power generated at the motor-generator and configured to supply the electric power to an electric load of an accessory device mounted to the hybrid vehicle; and a control device for controlling an operation of the engine, wherein the control device includes a processor for executing a control program, the control device being at least configured to:

obtain information of cooling water temperature, which is temperature of cooling water for the engine;

obtain information of a charging state of the electric-power charging device; and calculate an engine operating point including engine rotational speed and engine torque, wherein the engine operates in a first operating mode when the cooling water temperature is lower than a predetermined temperature and the charging state of the electric-power charging device has a remaining charging capacity, during a period in which the hybrid vehicle runs in the non-electric-vehicle running mode, in the first operating mode, the engine rotational speed and engine torque are calculated based on the charging state of the electric-power charging device, which realize such engine operation according to which a fuel consumption amount for a unit amount of electric power to be charged into the electric-power charging device is minimized, the engine operates in a second operating mode when the cooling water temperature is lower than the predetermined temperature and the charging state of the electric-power charging device has no remaining charging capacity, during the period in which the hybrid vehicle runs in the non-electric-vehicle running mode, and in the second operating mode, the engine rotational speed and engine torque, which realize such engine operation according to which minimum electric power is generated by the motor-generator, are calculated, wherein the minimum electric power satisfies at least electric power to be consumed by the electric load of the accessory device mounted to the hybrid vehicle.

2. A vehicle control system for a hybrid vehicle comprising:

an engine configured to produce a driving force for the hybrid vehicle, wherein the hybrid vehicle runs at least with the driving force of the engine in a non-electric-vehicle running mode;

a motor-generator configured to generate electric power when the motor-generator is driven to rotate by the engine, wherein the hybrid vehicle runs only with the electric power of the motor-generator in an electric-vehicle running mode;

an electric-power charging device connected to the motor-generator Configured to charge the electric power generated at the motor-generator and configured to supply the electric power to an electric load of an accessory device mounted to the hybrid vehicle; and a control device for controlling an operation of the engine, wherein the control device includes a processor for executing a control program, the control device being at least configured to:

obtain information of cooling water temperature, which is temperature of cooling water for the engine;

obtain a charging state of the electric-power charging device; and calculate an engine operating point based on a current cooling water temperature, a target temperature value for the cooling water temperature, a current charging-state value of the electric-power charging device and a target charging-state value for the charging state of the electric-power charging device, during a period in which the hybrid vehicle runs in the non-electric-vehicle running mode, wherein the engine operating point includes engine rotational speed and engine torque.

3. The vehicle control system according to claim 2, wherein the engine rotational speed and the engine torque are calculated, based on not only a temperature difference between the current cooling water temperature and the target temperature value but also a charging-state difference between the current charging state and the target charging-state value.

4. The vehicle control system according to claim 2, wherein the charging state of the electric-power charging device is predicted at a timing when the cooling water temperature reaches the target temperature value, and the target charging-state value is set based on a predicted charging-state value of the electric-power charging device.

* * * * *